UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE COMPOUNDS AND COLORING-MATTERS AND PROCESS OF MAKING SAME.

1,065,102.  Specification of Letters Patent.  Patented June 17, 1913.

No Drawing. Original application filed March 5, 1910, Serial No. 547,414. Divided and this application filed November 3, 1910. Serial No. 590,541.

*To all whom it may concern:*

Be it known that I, OSCAR BALLY, Ph. D., chemist, citizen of the Swiss Republic, residing at Mannheim, Germany, have invented certain new and useful Improvements in Anthracene Compounds and Coloring-Matters and Processes of Making Same, (which invention is divided out of my application for Letters Patent filed March 5, 1910, Serial No. 547,414,) and of which the following is a specification.

This invention relates to the production of compounds and coloring matters of the anthracene series.

I have discovered that new condensation products of the anthracene series of the type indicated by the general formula $A(S-R-COOH)_n$ as hereinafter defined can be obtained by causing an acid-substituted anthraquinone derivative which contains one or more than one substituting group or atom (for instance halogenated anthraquinone) to react upon a thiophenol-carboxylic acid body, and that those condensation products in the production of which an ortho-thiophenol-carboxylic acid body has been employed can be subjected to further condensation, yielding products which are anthraquinone thioxanthones and, either in the sulfonated form or in the unsulfonated form, can be used as coloring matters.

The new condensation products as hereinbefore set forth possess a constitution corresponding to the general formula $A(S-R-COOH)_n$ in which A indicates an anthraquinone residue, including a substituted anthraquinone residue, R is a simple, or substituted, aromatic residue, and although I express the new products of this formula as free acids, the metal salts or ethers with alkyl or aryl groups are equivalent, while $n$ indicates that one or more of the same or different residues may enter into the molecule.

Among the thiophenol-carboxylic acid bodies which can be used according to my invention I include thiophenol-carboxylic acids themselves, or a derivative of any one of these compounds, for instance a salt, or ester, thereof. Under the term substituted anthraquinone residue in this specification I do not include compounds in which the two carbonyl groups are not intact, such for instance as benzanthrone compounds and anthrapyridone compounds, since a separate application claiming the use of such compounds has been filed, Serial No. 619,105.

If the above mentioned thiophenol-carboxylic acids be used in the free state for the condensation, the carboxylic acid group is liable to be split off to a certain extent, and to this extent uncarboxylated compounds are obtained, but when the salts are used in this condensation, the desired carboxylated condensation compounds are obtained smoothly. When preparing the new condensation compounds according to this invention from halogenated anthraquinones containing more than one proportion of halogen, it is possible first to replace a portion of the halogen using one of the thiophenol-carboxylic acid compounds, and then to replace a further portion with the same or a different thiophenol-carboxylic acid compound, so that in this way mixed condensation products can be obtained. The reaction can be applied to the derivaties of anthraquinone itself which contain an acid substituting group, and the condensation can be effected with or without the addition of a substance which acts catalytically.

The condensation products obtainable according to this invention may for instance possess a constitution corresponding to one or other of the following formulæ:—

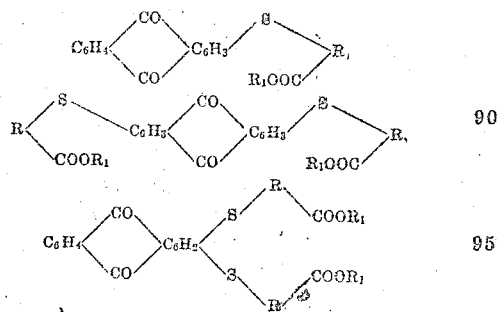

if more than two molecular proportions of the carboxylic acid compound enter the anthraquinone residue, analogous compounds are obtained.

The condensation products possess generally the following properties. They consist, when dry, of from yellow to red powders, are readily soluble in dilute alkali giving orange-yellow to red solutions, they yield from red to yellow solutions in glacial acetic acid, and from green to reddish brown solutions in concentrated sulfuric acid.

The coloring matters which can be obtained from those of the aforesaid condensation products which contain a carboxyl group in the ortho position to the sulfur atom, probably possess a constitution corresponding, for instance, to one or other of the following, or analogous, formulæ:—

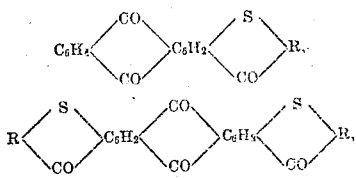
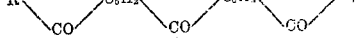

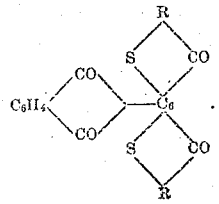

The condensation to form the coloring matter is preferably effected by means of an acid condensing agent, such for instance as sulfuric acid, fuming sulfuric acid, chlorosulfonic acid, phosphoric anhydrid, aluminium chlorid, and zinc chlorid, and the condensation can be carried out either in the presence or absence of a suitable diluting agent. When concentrated sulfuric acid, or other agent which is capable of bringing about sulfonation, is used for effecting the condensation, unsulfonated products are, as a rule, obtained when only a moderate reaction takes place, while by more energetic reaction sulfonated products result. The unsulfonated products can, if desired, be subsequently treated with sulfonating agents and be converted into their sulfonic acid derivatives.

The unsulfonated products are capable of use as vat coloring matters and yield from red to yellow shades of excellent fastness, they are insoluble in water and in dilute acids and alkalis, while they are soluble in concentrated sulfuric acid yielding red to yellow solutions. In particular, the coloring matter obtainable from anthraquinone-1.5-bis-thiosalicylic acid is, in the dry state, a red powder which yields a red solution in concentrated sulfuric acid and dyes cotton from the vat red shades. Its sulfonic acid also dyes wool brilliant red shades.

The following examples will serve to illustrate further how my invention can be carried into practical effect, but it is not confined to these examples. The parts are by weight.

Example 1: Mix together one hundred parts of 1.5-dichlor-anthraquinone, one hundred and twenty-five parts of thiosalicylic acid, one hundred parts of caustic potash, and two thousand parts of absolute alcohol. Boil the mixture till no unchanged dichloranthraquinone is noticeable, allow the mass to cool, collect, by filtering, the potassium salt of the anthraquinone-1.5-bis-thiosalicylic acid which is obtained, dissolve in water, and precipitate the new condensation product in the form of the free acid by the addition of hydrochloric acid. When dry, the said product is an orange-yellow powder, difficultly soluble in water, readily soluble in dilute caustic soda, giving an orange-yellow solution, and soluble in cold sulfuric acid, giving a bottle-green solution. The solution in sulfuric acid containing boric acid is orange-brown.

Example 2: Introduce one part of anthraquinone-1.5-bis-thiosalicylic acid (obtainable from 1.5-dichlor-anthraquinone and sodium thiosalicylate) into five parts of fuming sulfuric acid, containing twenty-three per cent. free $SO_3$, while avoiding, as far as possible, a rise in temperature. The solution, which is at first violet, gradually becomes brown and finally (after standing for some time) red. Then pour the reaction liquid into water and filter off and wash the product which separates out in red flakes. When dry, it is a red powder which yields a red solution in concentrated sulfuric acid.

On treating the product of the foregoing Example 2 with a sulfonating agent, for instance with warm fuming sulfuric acid, a sulfonic acid can be obtained which dyes wool brilliant red shades of great fastness. In a similar manner, other analogous compounds can be obtained from the other condensation products hereinbefore mentioned.

Now what I claim is:—

1. In the production of anthraquinone thioxanthones the process which consists in producing compounds of the anthracene series possessing a constitution corresponding to the formula $A(S-R-COOH)_n$ in which A represents an anthraquinone residue, R represents an aromatic residue, $n$ represents a number, by causing an acid-substituted anthraquinone derivative to react upon an ortho-thiophenol-carboxylic acid body.

2. In the production of anthraquinone-dithioxanthones the process which consists in producing condensation products of the anthraquinone series by causing halogenated anthraquinone to react upon thiophenol-ortho-carboxylic acid.

3. In the production of anthraquinone-dithioxanthone the process which consists in producing anthraquinone-1.5-bis-thiosalicylic acid by acting upon 1.5-dichlor-anthraquinone with thiosalicylic acid.

4. The process of producing anthraquinone-thioxanthones by causing an acid-substituted anthraquinone derivative to react upon an ortho-thiophenol-carboxylic acid body and then subjecting the product thus obtained to the action of a condensing agent.

5. The process of producing coloring matters of the anthracene series being anthraquinone-thioxanthones by causing a halogenated anthraquinone to react upon thiophenol-ortho-carboxylic acid and then subjecting the product thus obtained to the action of a condensing agent.

6. The process of producing coloring matter of the anthracene series being anthraquinone-dithioxanthone by reacting upon 1.5-dichlor-anthraquinone with thiophenol-ortho-carboxylic acid and then treating the anthraquinone-1.5-bis-thiosalicylic acid so obtained with a condensing agent.

7. As new articles of manufacture the coloring matters which are anthraquinone-thioxanthones, which coloring matters are insoluble in water and in dilute acids and alkalis, are soluble in concentrated sulfuric acid yielding red to yellow solutions, and dye cotton from the vat yellow to red shades of excellent fastness.

8. As a new article of manufacture anthraquinone-dithioxanthone corresponding to the formula

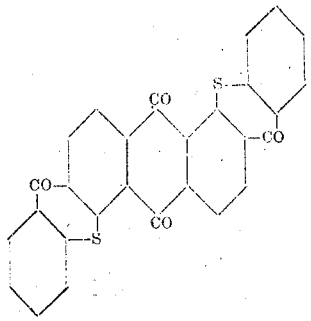

which in the unsulfonated state is insoluble in water, and in dilute acids and alkalis, and consists, when dry, of a red powder which yields a red solution in concentrated sulfuric acid and dyes cotton from a vat red shades of excellent fastness, and which, in the unsulfonated form dyes wool red.

In testimony whereof I have hereunto set my hand in the presence of two subscribing witnesses.

OSCAR BALLY.

Witnesses:
 ERNEST F. EHRHARDT,
 A. O. TITTMANN.